US009621657B2

(12) United States Patent
Hussein et al.

(10) Patent No.: US 9,621,657 B2
(45) Date of Patent: Apr. 11, 2017

(54) DATABASE SESSION DEPENDENT ROUTING

(71) Applicant: Verizon Patent and Licensing Inc., Basking Ridge, NJ (US)

(72) Inventors: Laith Hussein, Irving, TX (US); Sivanahamaiah Meda, Irving, TX (US); Manah M. Khalil, Irving, TX (US); Eric T. McLain, Westampton, NJ (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1141 days.

(21) Appl. No.: 13/727,204

(22) Filed: Dec. 26, 2012

(65) Prior Publication Data

US 2014/0181311 A1    Jun. 26, 2014

(51) Int. Cl.
*H04L 29/08* (2006.01)

(52) U.S. Cl.
CPC ........ *H04L 67/141* (2013.01); *H04L 67/1027* (2013.01)

(58) Field of Classification Search
CPC ............... H04L 67/1027; H04L 67/104; H04L 67/1023; H04L 67/1065; G06F 17/3056
See application file for complete search history.

(56) References Cited

U.S. PATENT DOCUMENTS

| | | | | |
|---|---|---|---|---|
| 2003/0086423 | A1* | 5/2003 | Hsu | H04L 12/1886 370/390 |
| 2005/0147087 | A1* | 7/2005 | Sternagle | H04L 29/06 370/352 |
| 2009/0245113 | A1* | 10/2009 | Kamiya | H04L 65/80 370/238 |
| 2011/0164749 | A1* | 7/2011 | Natarajan | H04W 12/06 380/270 |
| 2012/0284296 | A1* | 11/2012 | Arifuddin | H04L 67/1027 707/769 |
| 2012/0331146 | A1* | 12/2012 | Hsu | H04L 67/104 709/226 |

* cited by examiner

*Primary Examiner* — Philip Chea
*Assistant Examiner* — Mohammed Ahmed

(57) ABSTRACT

A network device issues a globally unique identifier (GUID) to an application for use in a database read/write session. The network device determines a session key based on the GUID. The network device determines a total number of database nodes available to handle a read/write session with the application, and determines one of the database nodes to route a session to based on applying a modulo function to the session key and to the determined total number of database nodes. The network device, when determining the one of the database nodes to route the session to, applies the function (X mod Y)+1, where X is the session key and Y is the total number of database nodes available to handle the read/write session with the application.

17 Claims, 12 Drawing Sheets

DATABASE SESSION DEPENDENT ROUTING

BACKGROUND

A data center typically includes redundant power supplies, redundant network communication connections, environmental controls and network security devices. A data center can implement one or more databases that can be accessed by external applications for reading data from, or writing data to, the one or more databases. Multiple data centers can implement distributed or cloud databases that remotely store data on a large scale.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement session dependent routing of database operations based on session keys distributed to database-using applications as part of a globally unique identifier (GUID). The session keys may be determined for each session so as to selectively route database operations during a given session between an application and a same database node. The database operations may be routed by applying a modulo function to the session key and using the result of the function as an index into a routing table for determining the endpoint database node to which connection requests from an application are routed. Session dependent routing, as described further below, permits database load balancing, such that connection requests from different applications can be selectively routed to different database nodes to balance the load over multiple databases. Session dependent routing, as also described further below, permits database scalability such that new database nodes may added to existing multiple database nodes without impacting the servicing of connection requests from applications.

Figure 1:
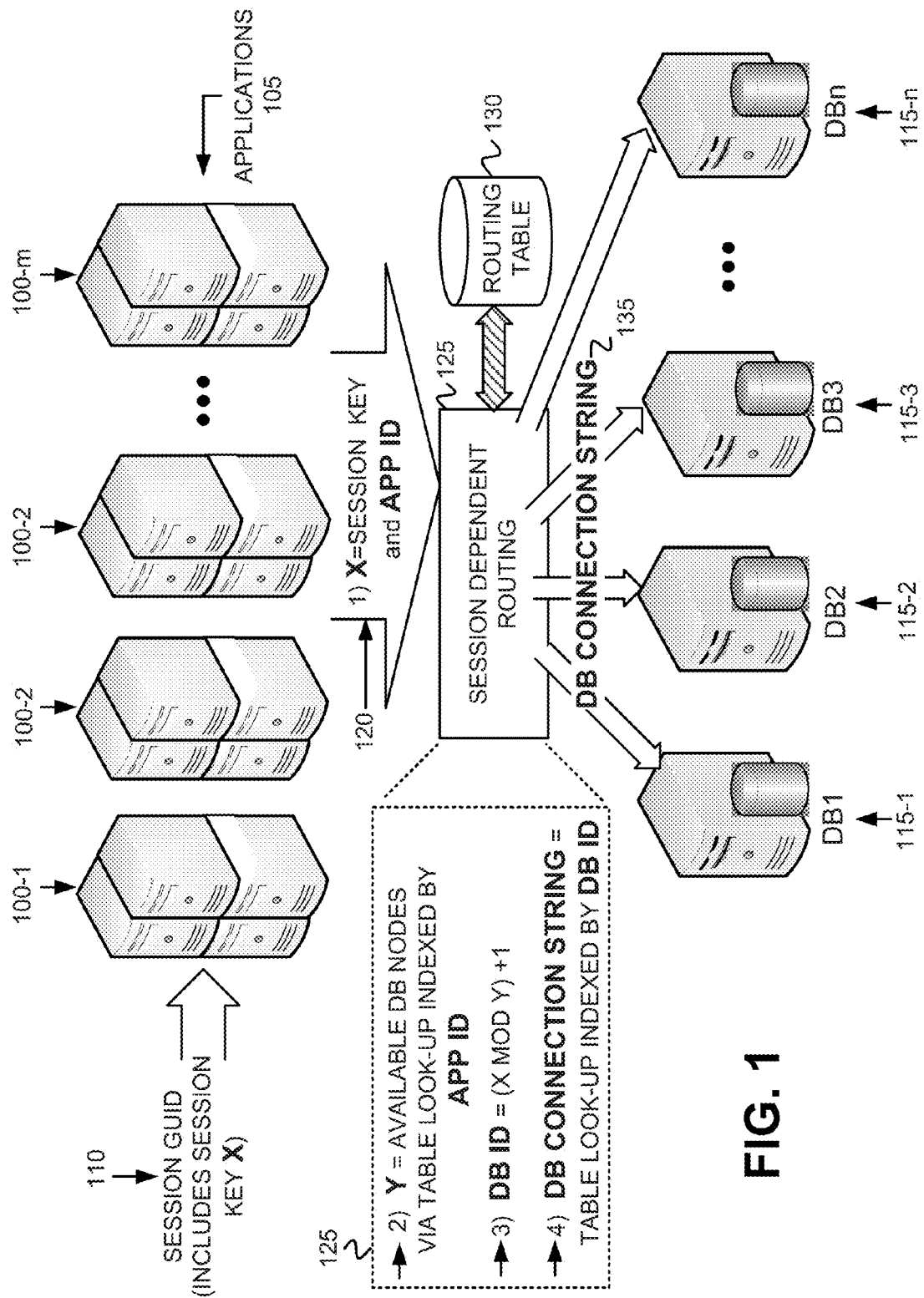
FIG. 1 illustrates an overview of session dependent database routing according to an exemplary embodiment.

FIG. 1 illustrates an overview of session dependent database routing according to an exemplary embodiment. As shown, multiple application servers 100-1 through 100-m (generically and individually referred to herein as "application server 100") implementing multiple applications 105 (individually referred to herein as "application 105") may request and receive session globally unique identifiers (GUIDs) 110 (individually referred to herein as "GUID 110") from a session management system (not shown). A "session," as referred to herein, includes one or more data operations performed between an application 105 and a database node (referred to herein as a "database"). Once a session GUID is assigned to an application, database operations (e.g., data read from, or data write to) during that session will go to a same database node.

Application servers 100-1 through 100-m may be components of a single server farm, or multiple server farms. Each of application servers 100-1 through 100-m may implement one or more of applications 105. Each application 105 implemented at applications servers 100-1 through 100-m may be assigned a unique application identifier (ID). A portion of a GUID 110 received at an application 105 may be extracted from session GUID 110 to be used in determining a session key X. The session key X may, for example, be determined using a certain number of digits from a certain location within the session GUID 110 (e.g., the first six digits of the session GUID). To request a database (DB) connection with servers 115-1 through 115-n, application 105 may send the previously received session key X and the application ID for session dependent routing 125. The DB connection may be used by application 105 for performing a data read from, or data write to, one of DBs 115-1 through 115-n.

Session dependent routing 125 may involve a process implemented by the session management system (not shown) that includes look-ups into routing table 130 based on the session key X and the application ID contained in the DB connection request received from application 105. Session dependent routing 125 determines an available number (Y) of DB nodes for application 105 by performing a look-up into routing table 130 indexed by the app ID. Session dependent routing 125 determines a DB ID by performing the modulo operation (X mod Y)+1, where X is the session key, Y is the determined number of available DB nodes, and mod is the modulo function. Session dependent routing 125 determines a DB connection string 135 for the DB connection request by performing a look-up into routing table 130 indexed by the determined DB ID. The DB connection string may include an Internet Protocol (IP) address, a port number, and credentials for a given DB node of databases 115-1 through 115-n . The determined DB connection string 135 can be passed to application 105 at an application server 100 for performing a data read from, or data write to, the DB identified by DB connection string 135.

Figure 2:
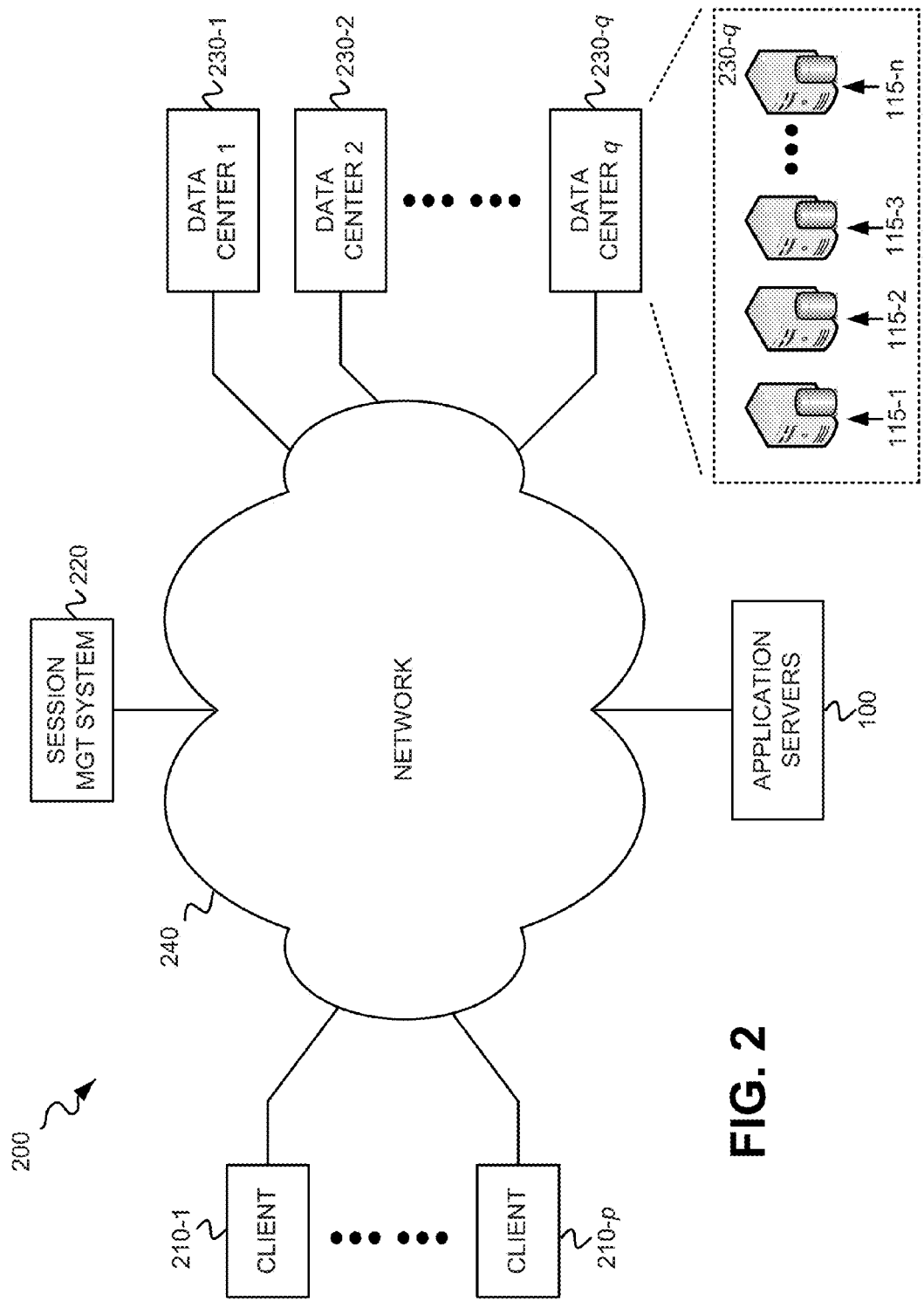
FIG. 2 depicts an exemplary network environment in which the session dependent routing of FIG. 1 can be implemented.

FIG. 2 depicts an exemplary network environment 200 in which the session dependent routing, described above with respect to FIG. 1, can be implemented. Network environment 200 may include multiple clients 210-1 through 210-p (individually and generically referred to herein as "client 210"), a session management system 220, application servers 100, data centers 230-1 through 230-q (individually and generically referred to herein as "data center 230"), and network 240.

Client devices 210-1 through 210-p may include any type of computing device that has communication capabilities. Client devices 210-1 through 210-p may each include, for example, a telephone (e.g., a smart phone), a computer (e.g., laptop, palmtop, desktop, or tablet computer), a set-top box (STB), a gaming device, or a personal digital assistant (PDA). Client devices 210-1 through 210-p may connect with network 240 via wired or wireless links.

Session management system 220 may include a network device (e.g., a server) that assigns session GUIDs to application servers 100, and that determines DB connection strings for application servers 100 based on the implementation of session dependent routing 125, as described briefly with respect to FIG. 1.

Data centers 230-1 through 230-q may, as shown in FIG. 2, each include multiple DBs 115-1 through 115-n that may be interconnected with one another and with network 240. Each of DBs 115-1 through 115-n of data center 230 may store and retrieve data based on DB connections received from applications implemented at application servers 100.

Network 240 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Network 240 may enable clients 210-1 through 210-p, session management system 220, application servers 100 and data centers 230-1 through 230-q to communicate with one another. In particular, clients 210-1 through 210-p may communicate with application servers 100 to request the execution of various applications; application servers 100 may communicate with session management system 220 to obtain a session GUID and to request a DB connection; and application servers 100 may communicate with DBs 115 at data centers 230-1 through 230-q, using DB connection strings supplied to applications servers 100 based on session dependent routing performed at session management system 200, for purposes of reading data from, or writing data to, DBs 115 at data centers 230-1 through 230-q.

The configuration of network components of network environment 200 shown in FIG. 2 is for illustrative purposes. Other configurations may be implemented. Therefore, network environment 200 may include additional, fewer and/or different components, that may be configured in a different arrangement, than that depicted in FIG. 2.

Figure 3:
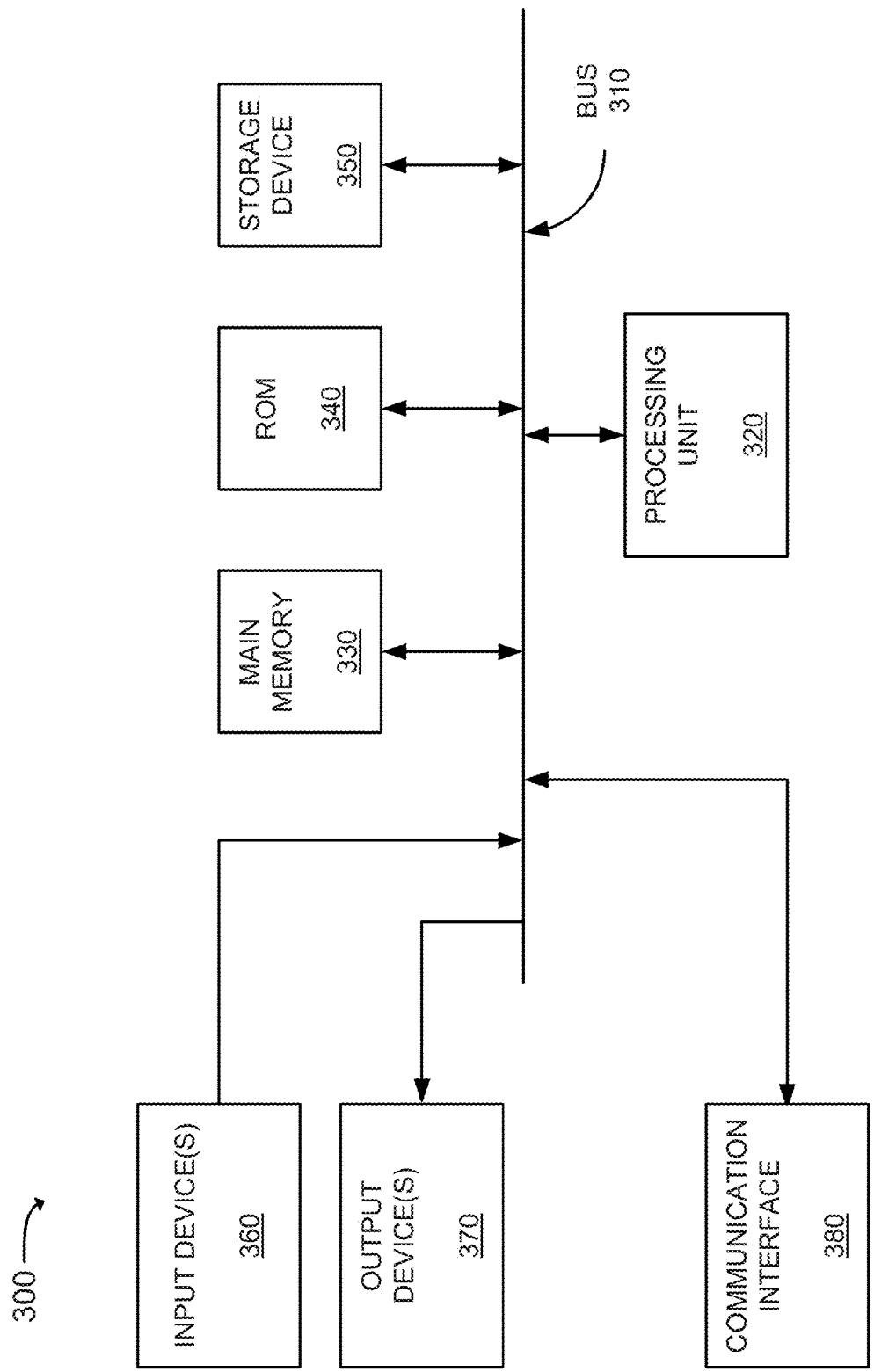
FIG. 3 is a diagram that depicts exemplary components of a network device that corresponds to the client, session management system, databases, and application servers of FIGS. 1 and 2.

FIG. 3 is a diagram that depicts exemplary components of a network device 300. Network device 300 may correspond to client 210, session management system 220, DBs 115-1 through 115-n of data center 230, and application server 100.

Network device 300 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of network device 300.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "computer-readable medium."

Input device 360 may include one or more mechanisms that permit an operator to input information to network device 300, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include a transceiver that enables network device 300 to communicate with other devices and/or systems. For example, communication interface(s) 380 may include wired or wireless transceivers for communicating via network 240.

The configuration of components of network device 300 illustrated in FIG. 3 is for illustrative purposes. Other configurations may be implemented. Therefore, network device 300 may include additional, fewer and/or different components than those depicted in FIG. 3.

Figure 4:
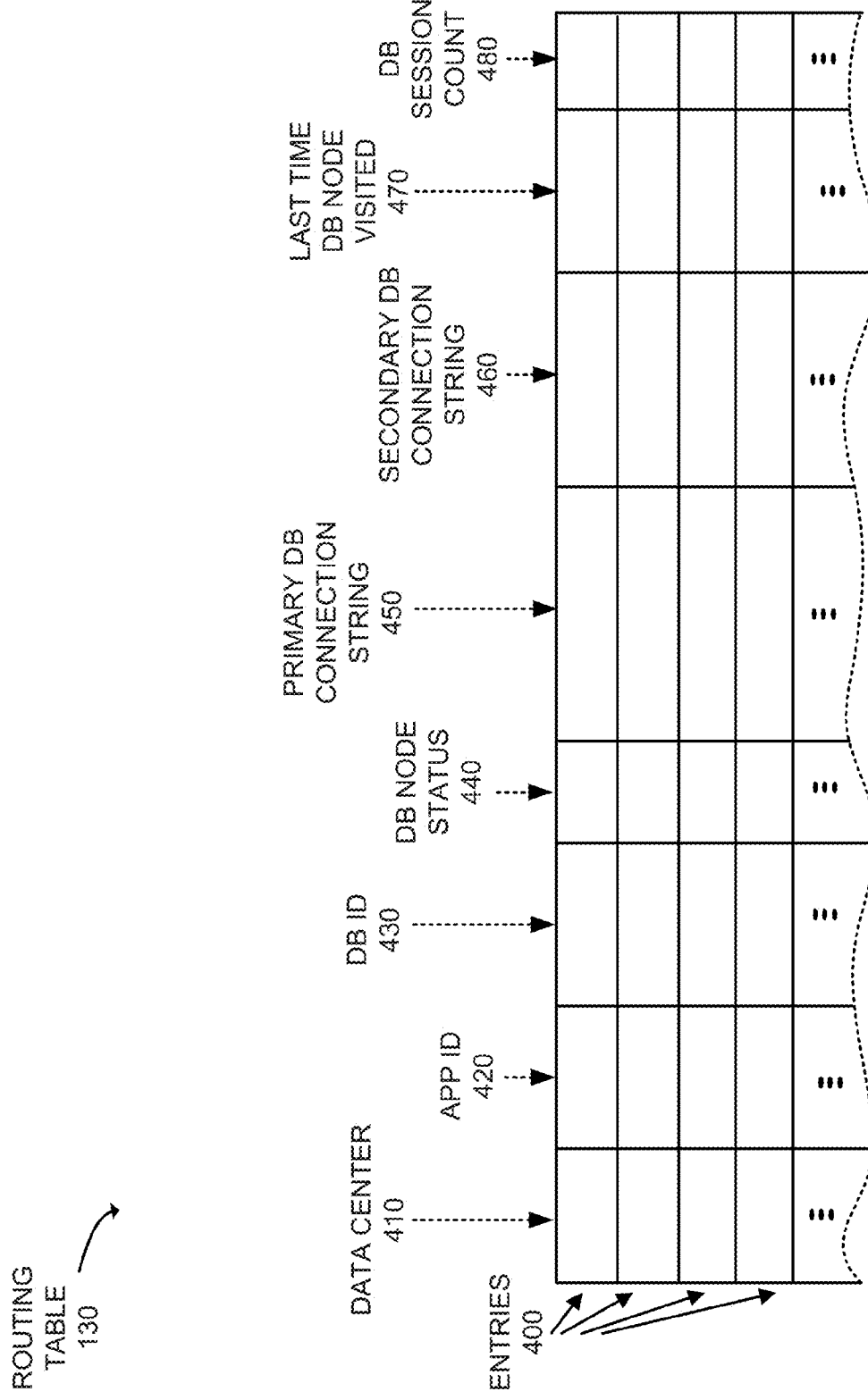
FIG. 4 illustrates an exemplary implementation of the routing table of FIG. 1.

FIG. 4 illustrates an exemplary implementation of routing table 130. As shown, routing table 130 may store multiple table entries 400, with each entry 400 including a data center field 410, an app ID field 420, a DB ID field 430, a DB node status field 440, a primary DB connection string field 450, a secondary DB connection string field 460, a last time DB node visited field 470, and a DB session count field 480.

Data center field 410 stores a unique identifier for a data center of data centers 230-1 through 230-q. App ID field 420 stores a unique identifier for an application implemented by application servers 100-1 through 100-m. DB ID field 430 stores an identifier used as an index into routing table 130 for retrieving primary or second DB connection strings. The DB ID may be determined by Eqn. (1), described below, based on the session key (X). DB node status field 440 stores a flag that identifies whether the DB identified in primary DB connection string field 450 is disabled or enabled. A DB (e.g., one of DBs 115) may be disabled, for example, during the performance of maintenance operations, or for other reasons.

Primary DB connection string field 450 stores a DB connection string that includes an Internet Protocol (IP) address for a primary DB that may be the primary DB for handling data write and read operations from an application 105, a port associated with the primary DB, and credentials for the primary DB. Secondary DB connection string field 460 stores a DB connection string that includes an Internet Protocol (IP) address for a secondary DB that may act as a backup DB for handling data write and read operations from an application 105 when the primary DB identified in field 450 is overloaded, or otherwise temporarily unavailable, a port associated with the secondary DB, and credentials for the secondary DB.

Last time DB node visited field 470 stores a time that the DB identified by primary DB connection string field 450 was last visited by the application. DB session count field 480 stores a number of times the DB identified by primary DB connection string field 450 has been visited by the application.

The number and content of the fields of each entry 400 of routing table 130 shown in FIG. 4 is for illustrative purposes. Each entry 400 of routing table 130 may include additional, fewer and/or different fields than those depicted in FIG. 4. For example, each entry 400 may omit DB node status field 440, last time DB node visited field 470 and/or DB session count field 480. Routing table 130 is depicted in FIG. 4 as a tabulated data structure for purposes of illustration. Other types of data structures, not shown, may also be used for associating data fields 410-480.

Figure 5:
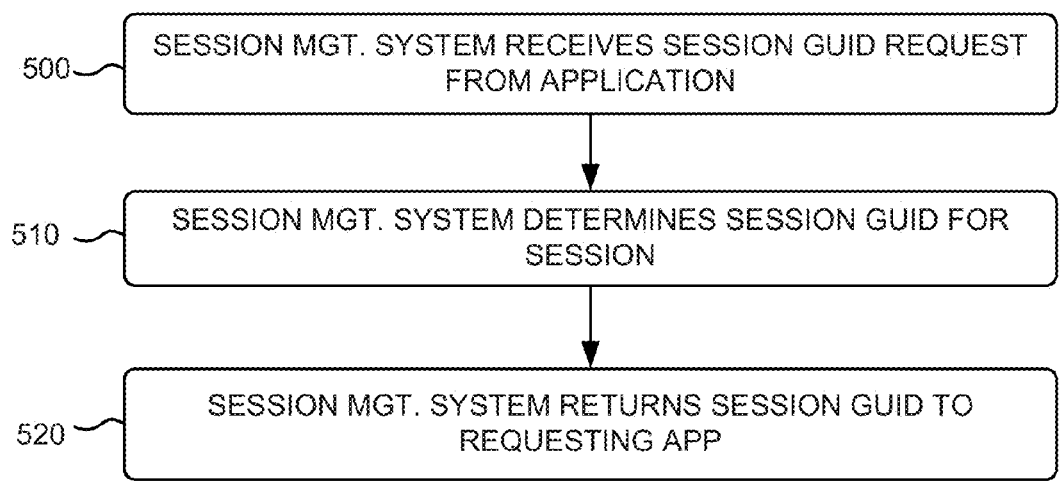
FIG. 5 is a flow diagram of an exemplary process for providing a session key and session GUID to a session requesting application.

FIG. 5 is a flow diagram of an exemplary process for providing a session key and session GUID to a session requesting application 105. The description of the exemplary process of FIG. 6 below refers to the exemplary messaging diagram of FIG. 6.

Figure 6:
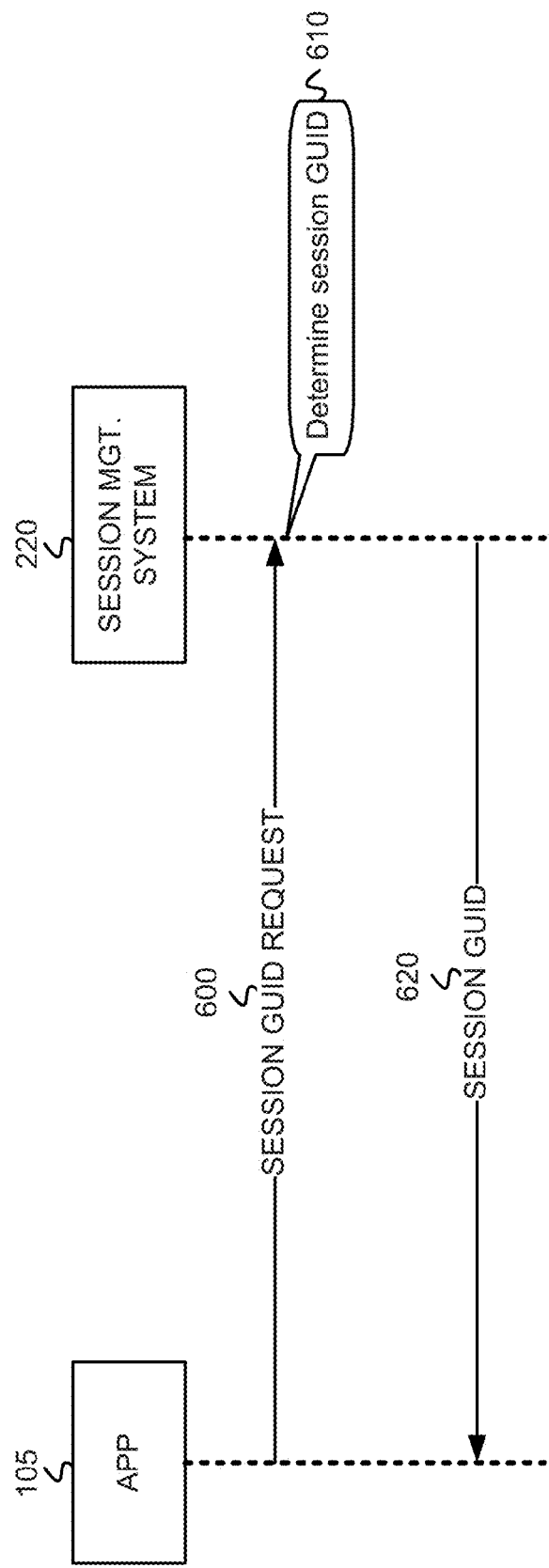
FIG. 6 is an exemplary messaging diagram associated with the exemplary process of FIG. 5.

The exemplary process may include session management system 220 receiving a session GUID request from an application 105 (block 500). Application 105 may need to begin a session for fetching data from, or writing data to, a database. Prior to beginning such a session application 105 sends a session GUID request to session management system 220 so that system 220 can grant or deny the session and, if granted, return a session GUID that application 105 can use to uniquely identify the session between application 105 and a database of databases 115-1 through 115-n. FIG. 6 depicts session management system 220 receiving a session GUID request message 600 from application 105.

Figure 8:
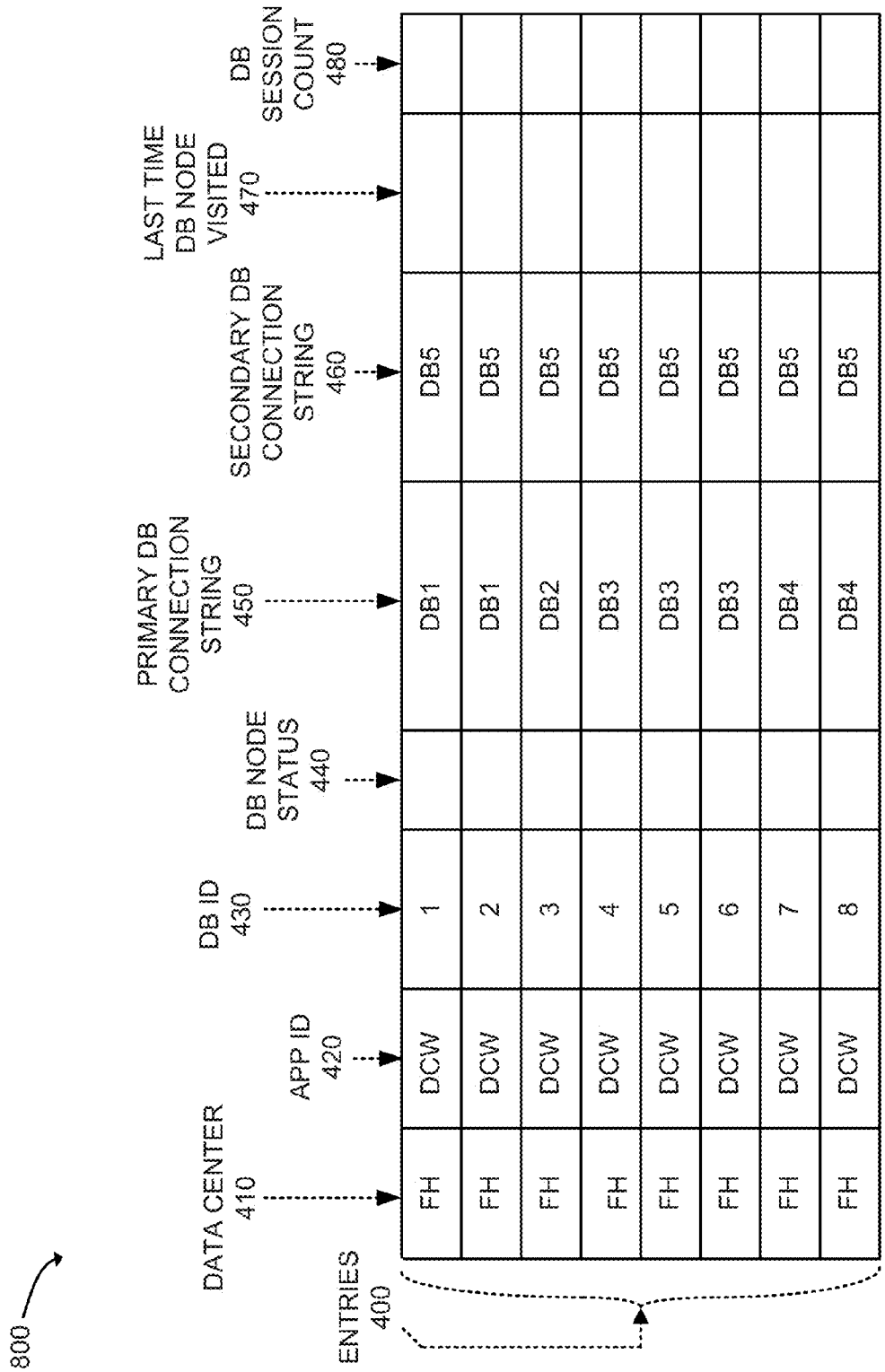
FIG. 8 is an example of a routing table lookup associated with the exemplary process of FIG. 7.

Session management system 220 may determine a GUID for the requested session (block 510). Session management system 200 may use any technique for assigning a GUID to the requested session provided that the GUID will be unique across existing sessions. Session management system 220 may maintain a record of all session GUID's previously issued such that system 220 can assign a globally unique session ID to the requested session. As one example, session management system 200 may assign the following as a GUID: fh-abb9ec74-e585-489d-ba85-cc26fb377477. The first q digits of the GUID may be used as a session key that, when applied to the modulo function of Eqn. (1) below, results in a DB ID in field 430 of routing table 130 such that the load is balanced among databases 115-1 through 115-n. For example, referring to the example routing table 800 of FIG. 8, the session key contained in the session GUID, when applied to the modulo function of Eqn. (1) below, results in a DB ID of 3 and a primary DB connection string of DB2. However, at another point in time, a session key contained in a session GUID assigned to a session in response to a session request from a different application, when applied to the modulo function of Eqn. (1) below, results in a DB ID of 4 and a primary DB connection string of DB3, thus, distributing the load between databases DB2 and DB3. In one implementation, the load may be distributed among the different DBs based on a configurable scaling factor. For example, a configured scaling factor of 0.3 may cause 30% of session requests to be assigned a session GUID that contains a session key that causes the database operations to be routed to DB2 and 70% of the session requests to be assigned a session GUID that contains a session key that causes database operations to be routed to DB3. FIG. 6 depicts session management system determining 610 the session GUID. Session management system 220 may return the session GUID to requesting application 105 (block 520). FIG. 6 depicts session management system 220 sending a message 620 that includes the session GUID to application 105.

Figure 7:
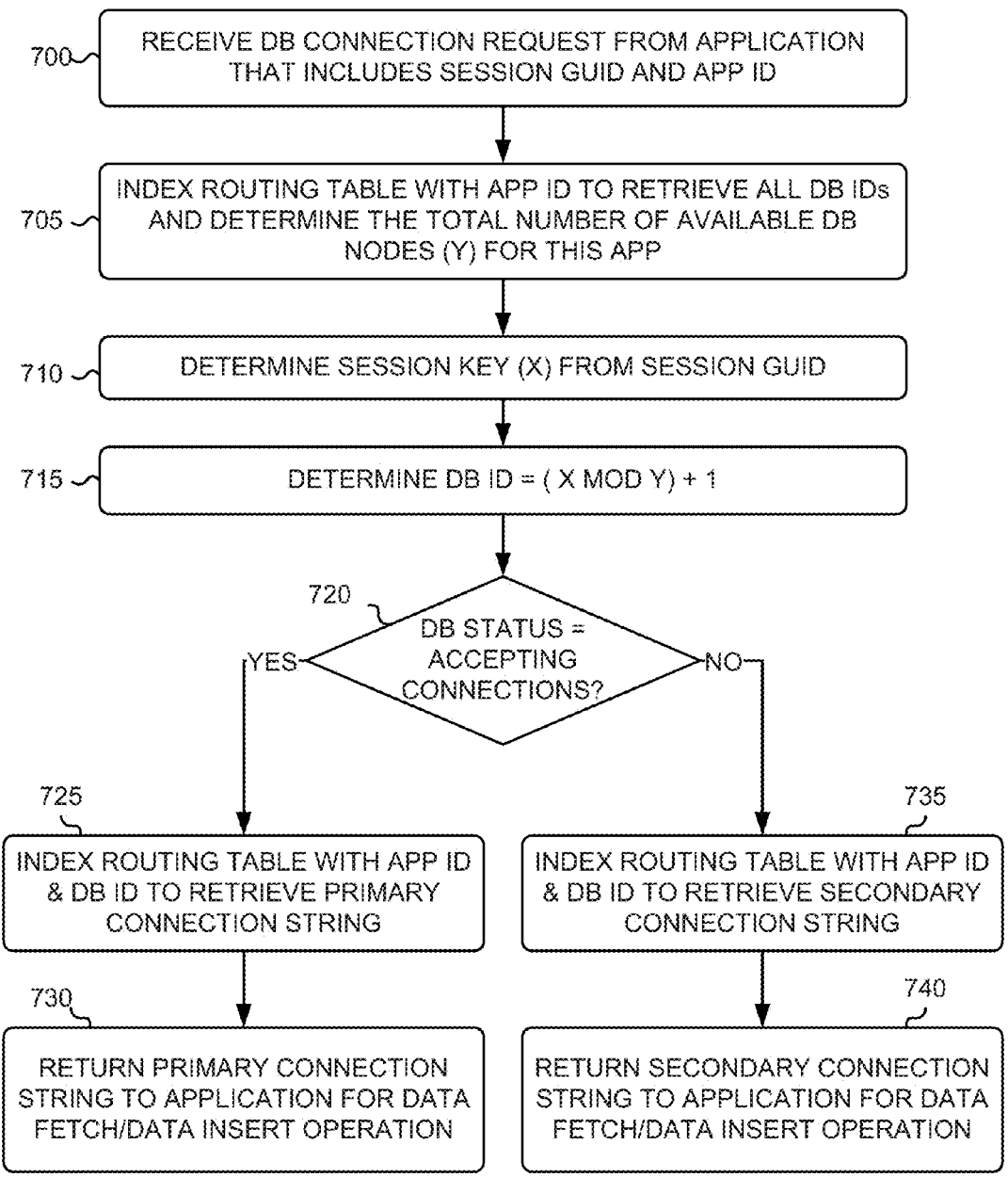
FIG. 7 is a flow diagram of an exemplary process for routing a database connection request to a database in a data center based on a session key.

FIG. 7 is a flow diagram of an exemplary process for routing a DB connection request to a DB 115 in a data center 230 based on a session key. The description of the exemplary process of FIG. 7 below refers to the example routing table 800 of FIG. 8.

The exemplary process may include receiving a DB connection request from application 105 that includes a session GUID and app ID (block 700). The session GUID may have previously been provided to application 105 by session management system 220 in block 530 of the exemplary process of FIG. 5.

Routing table 130 is indexed with the app ID to retrieve all databases and determine the total number of available DB nodes (Y) for this application 105 (block 705). Referring to the example routing table 800 of FIG. 8, session management system 220 may index routing table 800 by identifying entries 400 having contents of app ID field 420 that match the app ID received in the DB connection request from application 105. If the app ID received in the DB connection request is "DCW," then all of the entries depicted in routing table 800 of FIG. 8 have contents of app ID field 420 that match. From the entries having contents of app ID field 420 that match the app ID received in the DB connection request, session management system 220 may retrieve all of the databases identified in primary DB connection string 450 fields and secondary DB connection string field 460. In the example routing table 800 of FIG. 8, databases DB1, DB2, DB3, DB4 and DB5 are retrieved from fields 450 and 460 (with duplications). The available DB nodes (Y) for application 105 having application ID "DCW," therefore, consists of the set {DB1, DB2, DB3, DB4 and DB5} and the total number of available DB nodes (Y) for this application 105 is 5 (Y=5).

The session key (X) is determined from the session GUID (block 710). Session management system 220 determines the session key (X) by extracting certain digits from a certain location within the session GUID and summing the extracted digits together to determine the session key (X). For example, if the first q numeric digits of the session GUID are designated to be used for determining the session key (X), then session management system 220 may obtain the session GUID and extract the first q numeric digits from the session GUID. For example, if the session GUID is fh-abb9ec74-e585-489d-ba85-cc26fb377477, and q is six, then session management system 220 extracts the first six numeric digits 9 7 4 5 8 5 from the session GUID. Session management system 220 then sums the extracted numeric digits to determine the session key (X). For example, the first 6 numeric digits of the example session GUID (9 7 4 5 8 5), when summed together (9+7+4+5+8+5) returns a session key of 38. Any number of numeric digits from any location within the session GUID may be used for determining the session key (X). For example, the first 5 numeric digits of the session GUID, or the last 4 numeric digits of the session GUID, may be extracted and then summed together to determine the session key (X).

The DB ID is determined using the following equation:

$$DB\ ID = (X \bmod Y) + 1 \qquad \text{Eqn. (1)}$$

where mod is the modulo function that returns a remainder of the division of X by Y;
where X is the session key, and
where Y is the total number of DB nodes available for the application.

For example, if the session key (X) is 9 (X=9), and the total number of available DB nodes for application 105 is 5 (Y=5), then the DB ID is equal to (9 mod 5)+1=4. The DB ID is, therefore, equal to 4 in this example.

The status of the DB determined in block 715 is determined to see if the DB is accepting connections (block 720). The DB may not be accepting connections due, for example, to a temporary condition such as a failed network link, a power failure, temporary maintenance, etc. If the DB is accepting connections (YES-block 720), then routing table 130 is indexed with the app ID and DB ID to retrieve the primary connection string (block 725). Referring to the example of FIG. 8, if the app ID is "DCW" and the DB ID is 4, then session management system 220 indexes routing table 800 to identify the entry 400 that is the fourth entry down in the portion of routing table 800 shown in FIG. 8. From this identified entry 400, session management system 220 retrieves the contents of primary DB connection string field 450, which in this example is "DB3." The retrieved primary connection string is returned to application 105 for a data fetch or data insert operation (block 730). Application 105 may subsequently send a data fetch or data insert request to the DB identified by the primary connection string.

If the DB is not accepting connections (NO-block 720), then routing table 130 is indexed with the app ID and DB ID to retrieve the secondary connection string (block 735). Referring to the example of FIG. 8, if the app ID is "DCW" and the DB ID is 4, then session management system 220 indexes routing table 800 to identify the entry 400 that is the fourth entry down in the portion of routing table 800 shown in FIG. 8. From this identified entry 400, session management system 220 retrieves the contents of secondary DB connection string field 460, which in this example is "DB5." The retrieved secondary connection string is returned to application 105 for a data fetch or data insert operation (block 740). Application 105 may subsequently send a data fetch or data insert request to the DB identified by the secondary connection string. The exemplary process of FIG. 7 may be repeated for each DB connection request received from an application 105 at session management system 220.

Figure 9A:
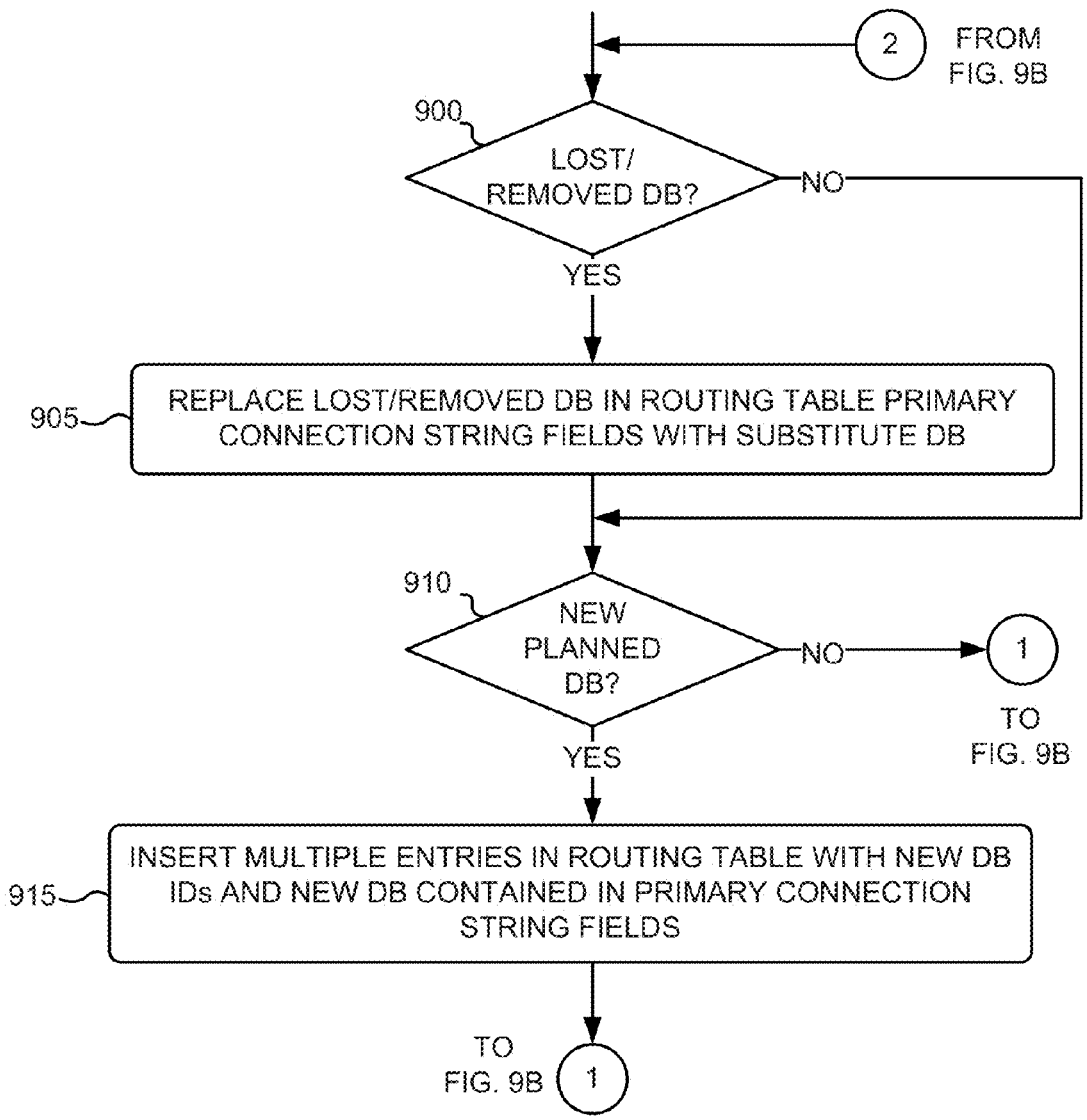
FIGS. 9A and 9B are flow diagrams of an exemplary process for modifying the routing table of FIG. 1 based on the existence of lost, removed or newly added databases, or based on the existence of stressed or overloaded databases.
Figure 9B:
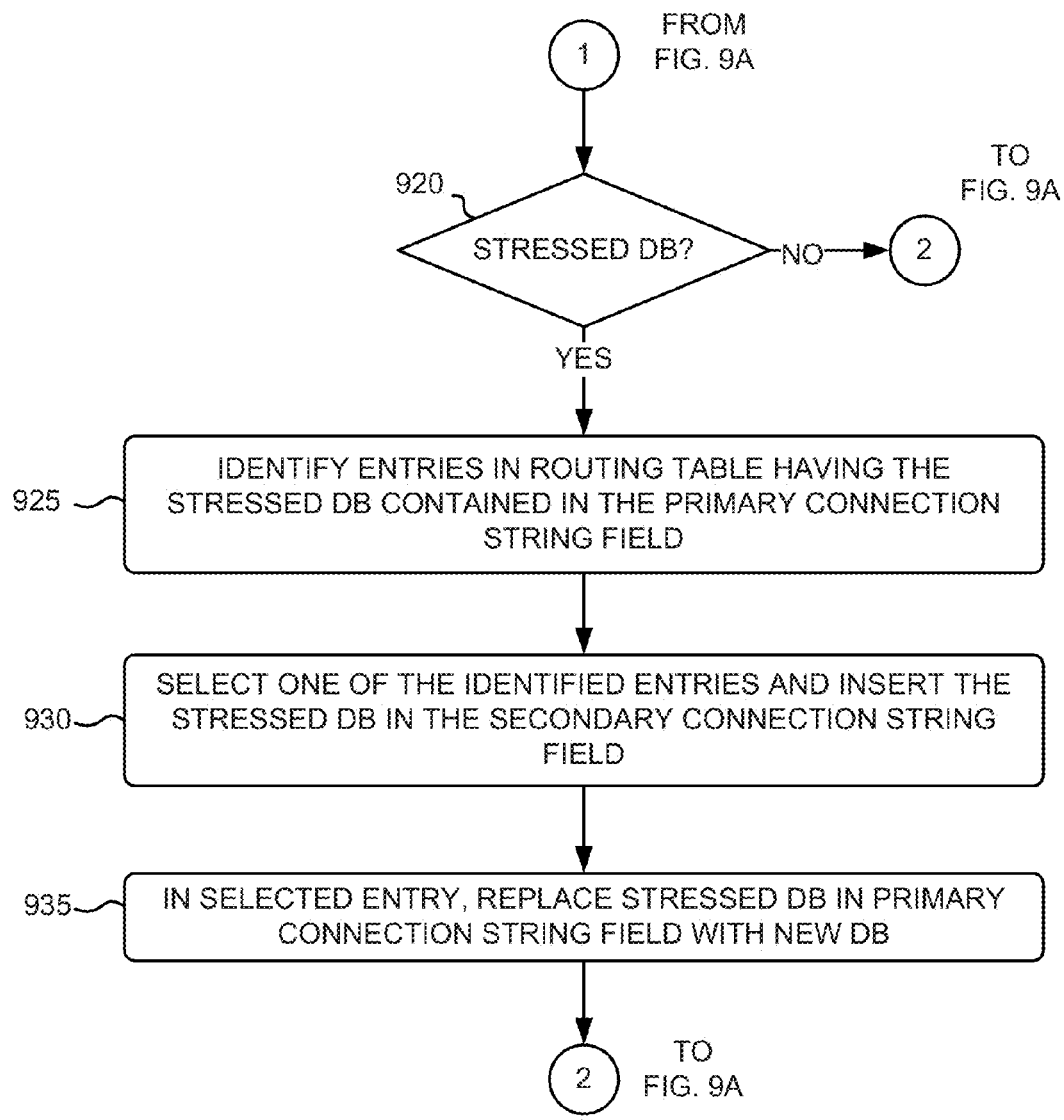
Figure 10:
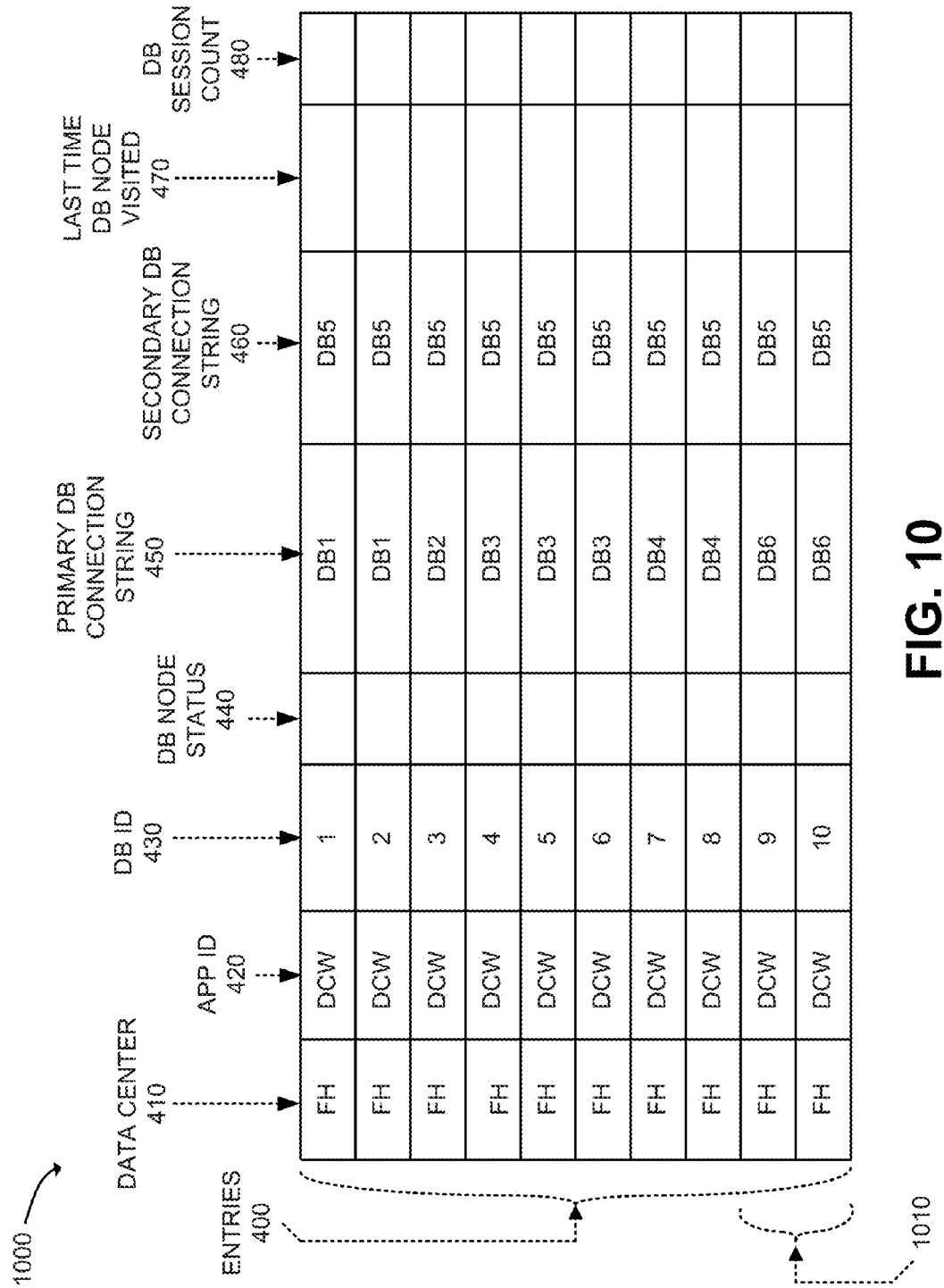
FIGS. 10 and 11 are examples of routing table modifications and routing table lookups associated with the exemplary process of FIGS. 9A and 9B.
Figure 11:
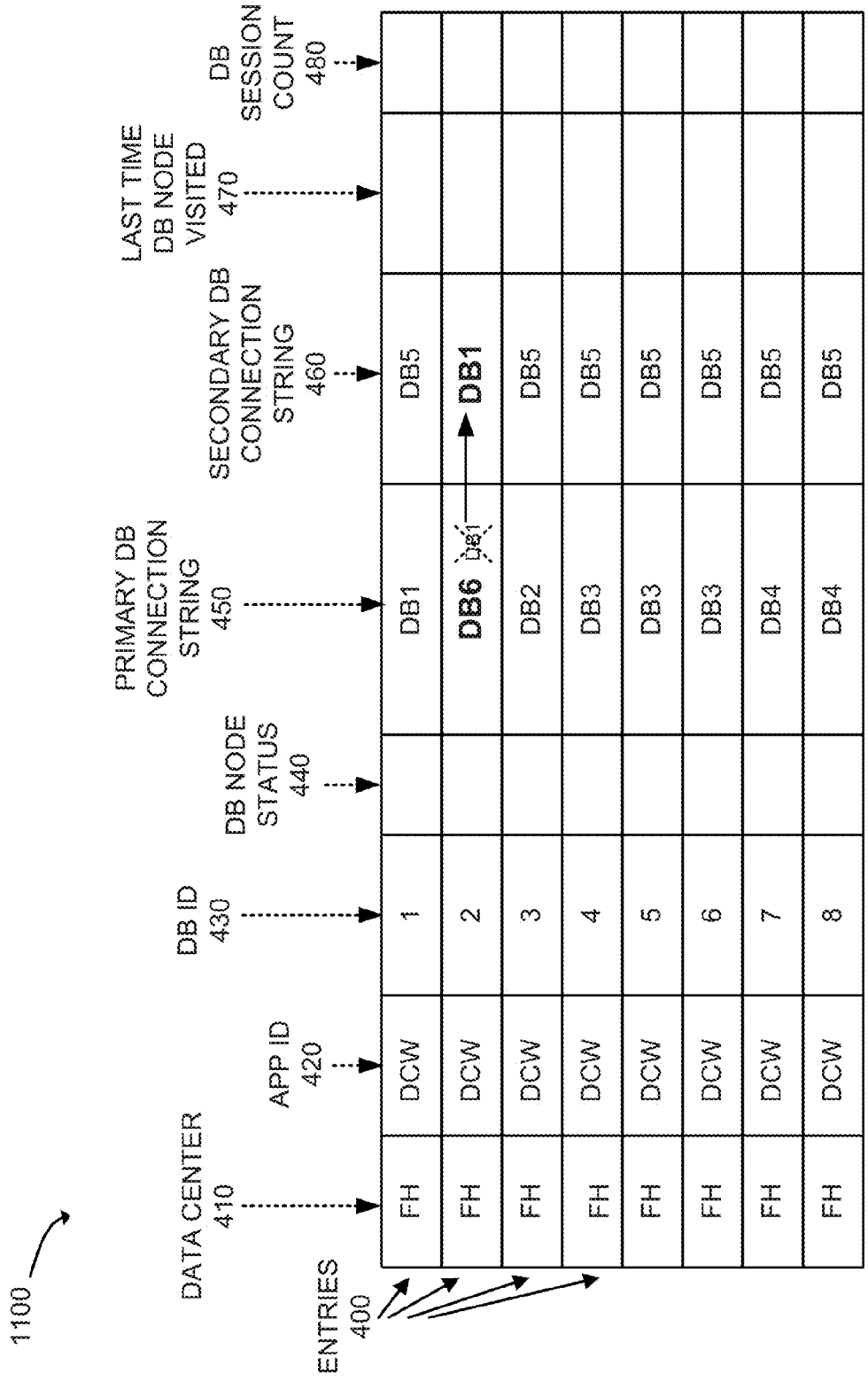

FIGS. 9A and 9B are flow diagrams of an exemplary process for modifying routing table 130 based on the existence of lost, removed, or newly added DBs, or based on the existence of stressed or overloaded DBs. The exemplary process of FIGS. 9A and 9B is described below as being executed by session management system 220. However, the exemplary process may be performed in whole, or in part, by network nodes other than, or in addition to, session management system 220. The description of the exemplary process of FIG. 9A and 9B below refers to the example routing tables of FIGS. 8, 10 and 11.

The exemplary process may include session management system 220 determining if a DB has been lost or removed (block 900). A database may be lost due to many different reasons, including, for example, hardware or software failure. A database may be removed for many different reasons also including, for example, hardware or software maintenance, or replacement of a failed database. Session management system 220 may determine if a DB has been lost or removed by automatic notification (e.g., via automatic message), or manual entry by an operator or administrator of the data center in which a DB is located.

If a DB has not been lost or removed (NO-block 900), then the exemplary process may continue at block 910. If a DB has been lost or removed (YES-block 900), then session management system 220 may replace the lost/removed DB in the routing table's primary connection string fields with a substitute DB (block 905). Referring to the example routing table 800 of FIG. 8, if DB1 is permanently lost or removed, then primary DB connection string field 450 in the first two entries 400 in the portion of table 800 shown in FIG. 8 may have "DB1" permanently replaced with "DB6," including the DB6's IP address, port and credentials of DB6.

Session management system 220 may determine if there is a new planned DB to add (block 910). In the case of an application requiring more backend database power, more DB nodes may need to be added to handle the increased connection requests. In this case of planned scalability, new entries may be added to routing table 130 that include additional DB IDs, additional primary DB connection strings, and additional secondary DB connection strings.

If there is a new DB to add (YES-block 920), then session management system 220 may insert multiple entries in the routing table with new DB IDs and a new DB contained in the primary connection string fields (block 915). Referring to example routing table 1000 of FIG. 10, two additional entries 1010 may be added to entries 400 of the example database 800 shown in FIG. 8. As shown, a first of the new entries 1010 has a DB ID of 9 in DB ID field 430, a primary DB connection string of DB6 in primary DB connection string field 450, and a secondary DB connection string of DB5 in secondary DB connection string field 460. As further shown, a second of the new entries 1010 has a DB ID of 10 in DB ID field 430, a primary DB connection string of DB6 in primary DB connection string field 450, and a secondary DB connection string of DB5 in secondary DB connection string field 460. Addition of the new database node to the routing table permits an increased load from the requesting application (e.g., application "DCW" in FIG. 10). If there is no new DB to add (NO-block 920), then the exemplary process may continue at block 920.

Session management system 220 may determine if there is a stressed DB (block 920). A "stressed DB," as referred to herein, may refer to a DB that incurs any type of temporary failure such as, for example, an excessive load (e.g., a number of data fetch/data insert connections that exceed a certain configurable threshold level), a temporary network link failure, a power failure, etc. Excessive load on a DB may impair DB performance, therefore, it may be desirable to "offload" a portion of the data fetch/data insert connections to a standby overload DB. If there are no stressed DBs (NO-block 920), then the process may return to block 900.

If there is a stressed DB (YES-block 920), then session management system 220 may identify entries 400 in routing table 130 having the stressed DB contained in the primary connection string field (block 925). Session management system 220 may select one of the identified entries 400 of routing table 130 and insert the stressed DB in the secondary connection string field (block 930). Session management system 220 may, in the selected entry of block 930, replace the stressed DB in the primary connection string field with a new DB (block 935). Referring to the example routing table 1100 of FIG. 11, if DB1 is identified as a stressed DB, then DB1 may be replaced by standby database DB6 in primary DB connection string field 450 as shown in the second entry of the portion of table 1100 shown in FIG. 11. Additionally, the stressed DB may be inserted into secondary DB connection string field 460 of the second entry. Therefore, DB6 will handle data connection requests from application 105 as a primary connection string, with DB1 temporarily being a secondary connection string until the condition resulting in DB1' stressed state ceases to exist. The exemplary process may return to block 900 such that blocks 900-935 operate in a continuous loop, with session management system 220 continuously assessing the need for the modification of entries of routing table 130 based on lost or removed DBs, newly added DBs, or based on stressed or overloaded DBs.

Through control of values of the session key (X), exemplary embodiments described herein permit load balancing of DB connection requests to multiple DB nodes, including customized load balancing according to a customizable scaling factor. Exemplary embodiments described herein further permit the removal of DB nodes without impacting an application 105's database operations, and also permit scalability such that new DB nodes may be added to the existing DB nodes without detrimentally impacting application database operations.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 7, 9A and 9B, the order of the blocks may be varied in other implementations. Moreover, non-dependent blocks may be performed in parallel. Exemplary embodiments of routing table 130 are described herein with a primary DB connection string and a secondary DB connection string for each app ID and DB ID combination. However, N x N connection strings may be implemented in routing table 130, where N is the number of available database nodes. In this implementation, a matrix like structure may include multiple secondary DB connection strings (or backup nodes) for each primary DB connection string, with all of the available connection strings acting as backup connection strings. In the case of losing a DB, a data fetch operation disables an unreachable DB node and goes through the available DB nodes based on a new total number of available nodes used to determine the DB ID using the modulo function of Eqn. (1).

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a network device, a session request from an application;
   determining a session globally unique identifier (GUID) for a session and returning the session GUID to the requesting application;
   receiving, at the network device, a connection request from the application for performing at least one data read or data write operation, wherein the connection request includes the session GUID and an application identifier (ID) associated with the application;
   determining a session key (X) by performing one or more operations upon one or more digits of the session GUID;
   determining a total number (Y) of database (DB) nodes, of a plurality of database nodes, available for handling connections from the application;
   determining a DB ID by applying a modulo operation to the determined session key (X) and the determined total number (Y) of available DB nodes;
   indexing a routing table, with the DB ID and the application ID, to retrieve contents of a status field that indicates whether a first database node, of the plurality of database nodes, is accepting connections for read/write sessions;
   selectively retrieving, when indexing the routing table with the DB ID and the application ID, a database connection string from a primary connection string field or from a secondary connection string field in the routing table, based on whether the retrieved contents of the status field indicates that the first database node is accepting connections for read/write sessions,
      wherein if the database connection string is retrieved from the primary connection string field in the routing table then the first database node comprises a primary database node for handling read/write sessions with the application, and
      wherein if the database connection string is retrieved from the secondary connection string field in the routing table then a second database node, that is different than the first database node, comprises a backup, secondary database node for handling read/write sessions with the application, and
   transmitting, to the application, a network address, of the first database node from the primary connection string field or the second database node from the secondary connection string field, for the application to perform the at least one data read or data write operation with the first database node or the second database node.

2. The method of claim 1, wherein determining the DB ID comprises:
   using the modulo operation (X mod Y)+1 to determine the DB identifier, wherein the modulo function (mod) determines a remainder of a division of the session key (X) by the total number (Y) of available DB nodes.

3. The method of claim 1, wherein performing the one or more operations upon the one or more digits of the session GUID comprises:
   extracting q numeric digits of the one or more digits from a location within the session GUID to determine the session key (X).

4. The method of claim 3, wherein the location within the session GUID comprises the first or the last q numeric bits of the session GUID.

5. The method of claim 3, wherein performing the one or more operations upon the one or more digits of the session GUID comprises further comprises:
   summing each of the q numeric digits, extracted from the session GUID, with one another to determine the session key (X).

6. A network device, comprising:
   a communication interface configured to connect to a network;
   a memory configured to store a routing table; and
   a processing unit configured to:

issue, via the communication interface to an application, a session globally unique identifier (GUID) to an application for use in a database read/write session,
determine a session key based on the session GUID;
determine a total number of database nodes, of a plurality of database nodes, available to handle the database read/write session with the application,
determine a database identifier (DB ID) based on applying a modulo operation to the session key and to the determined total number of database nodes of the plurality of database nodes,
index a routing table, with the determined DB ID and an application identifier associated with the application, to retrieve contents of a status field that indicates whether a first database node, of the plurality of database nodes, is accepting connections for read/write sessions,
selectively retrieve, when indexing the routing table with the DB ID and the application ID, a database connection string from a primary connection string field or from a secondary connection string field, in the routing table, based on whether the retrieved contents of the status field indicates that the first database node is accepting connections for read/write sessions,
wherein if the database connection string is retrieved from the primary connection string field in the routing table then the first database node comprises a primary database node for handling read/write sessions with the application, and
wherein if the database connection string is retrieved from the secondary connection string field in the routing table then a second database node, that is different than the first database node, comprises a backup, secondary database node for handling read/write sessions with the application; and
return, via the communication interface to the application, a network address, of the first database node from the primary connection string field or the second database node from the secondary connection string field, for the application to perform at least one data fetch or data insert operation with the first database node or the second database node during the database read/write session.

7. The network device of claim 6, wherein, when determining the session key, the processing unit is further configured to:
determine the session key (X) by extracting q numeric digits from a location within the session GUID.

8. The network device of claim 7, wherein the location within the session GUID comprises the first, or the last, q numeric bits of the session GUID.

9. The network device of claim 7, wherein, when determining the session key (X), the processing unit is configured to:
sum each of the q numeric digits, extracted from the session GUID, with one another to determine the session key (X).

10. The network device of claim 6, wherein, when determining the database identifier (DB ID), the processing unit is further configured to:
apply the modulo operation DB ID=(X mod Y)+1, wherein X is the session key,
Y is the total number of available database nodes, and mod is a modulo function that determines a remainder of a division of the session key (X) by the total number (Y) of available DB nodes.

11. A non-transitory computer-readable medium containing instructions executable by at least one processor, the non-transitory computer-readable medium comprising:
one or more instructions for issuing a session globally unique identifier (GUID) to an application for use in a database read/write session;
one or more instructions for extracting q numeric digits from a location within the session GUID and performing an operation upon the extracted q numeric digits to determine a session key for the database read/write session;
one or more instructions for determining a total number of database nodes, of a plurality of database nodes, available to handle the database read/write session with the application;
one or more instructions for determining a database identifier (DB ID) by applying a modulo function to the session key and to the determined total number of database nodes;
one or more instructions for indexing a routing table, with the DB ID and an application ID associated with the application, to retrieve contents of a status field that indicates whether a first database node, of the plurality of database nodes, is accepting connections for read/write sessions;
one or more instructions for selectively retrieving, when indexing the routing table with the DB ID and the application ID, a database connection string from a primary connection string field or from a secondary connection string field in the routing table, based on whether the retrieved contents of the status field indicates that the first database node is accepting connections for read/write sessions,
wherein if the database connection string is retrieved from the primary connection string field in the routing table then the first database node comprises a primary database node for handling read/write sessions with the application, and
wherein if the database connection string is retrieved from the secondary connection string field in the routing table then a second database node, that is different than the first database node, comprises a backup, secondary database node for handling read/write sessions with the application, and
one or more instructions for returning to the application, a network address, of the first database node from the primary connection string field or the second database node from the secondary connection string field, for the application to perform at least one data fetch or data insert operation with the first database node or the second database node during the database read/write session.

12. The non-transitory computer-readable medium of claim 11, wherein the location within the session GUID comprises the first or the last q numeric bits of the session GUID.

13. The non-transitory computer-readable medium of claim 11, wherein the one or more instructions for performing the operation upon the extracted q numeric digits further comprise:
one or more instructions for summing each of the q numeric digits, extracted from the session GUID, with one another to determine the session key.

14. The non-transitory computer-readable medium of 11, wherein the one or more instructions for determining the DB ID further comprise:
- one or more instructions for applying the function (X mod Y)+1,
- wherein X is the session key,
  - Y is the total number of database nodes available to handle the database read/write session with the application, and
  - mod the modulo function that determines a remainder of a division of the session key (X) by the total number (Y) of available DB nodes.

15. The method of claim 1, wherein determining the total number of database nodes further comprises:
- indexing the routing table with the application ID to determine the total number of database nodes based on one or more fields of the routing table having applications IDs that match the application ID.

16. The network device of claim 6, wherein the communication interface is further configured to:
- receive a connection request from the application for performing at least one data read or data write operation during the database read/write session, wherein the connection request includes the GUID and an application identifier (ID) associated with the application, and
- wherein, when determining the total number (Y) of database nodes, the processing unit is further configured to:
- index the routing table with the application ID to determine the total number (Y) of database nodes based on one or more fields of the routing table having applications IDs that match the application ID.

17. The non-transitory computer-readable medium of claim 11, further comprising:
- one or more instructions for receiving a connection request from the application for performing the at least one data read or data write operation during the database read/write session, wherein the connection request includes the GUID and the application identifier,
- wherein the one or more instructions for determining the total number of database nodes further comprise:
- one or more instructions for indexing a routing table with the application ID to determine the total number of database nodes based on one or more fields of the routing table having applications IDs that match the application ID.

* * * * *